Jan. 5, 1943.                J. R. SMAK                2,307,426
            AUTOMATIC SLOW-UP AND STOP MECHANISM
                  Filed Sept. 12, 1941        8 Sheets-Sheet 1
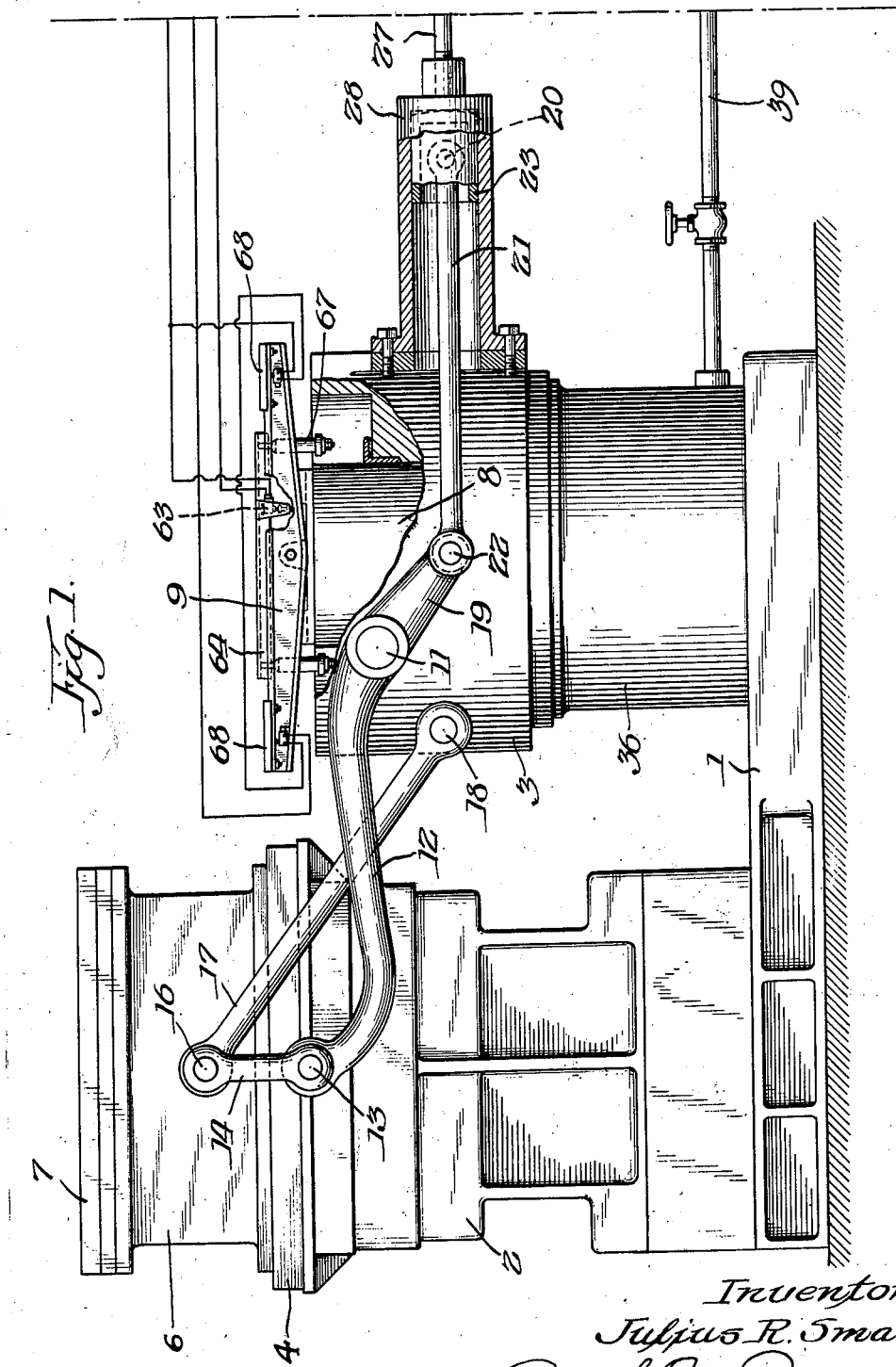

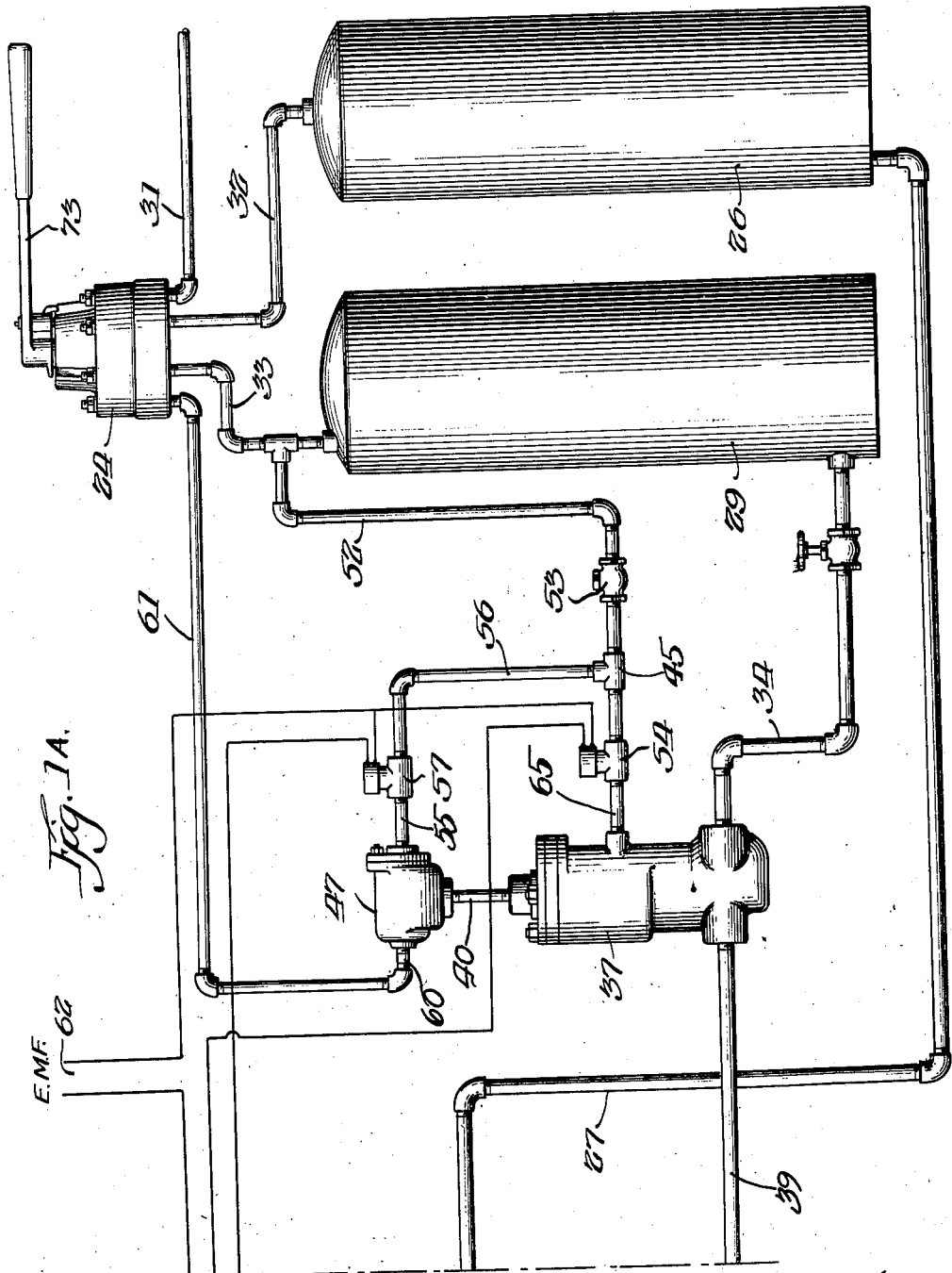

Jan. 5, 1943.  J. R. SMAK  2,307,426
AUTOMATIC SLOW-UP AND STOP MECHANISM
Filed Sept. 12, 1941  8 Sheets-Sheet 3
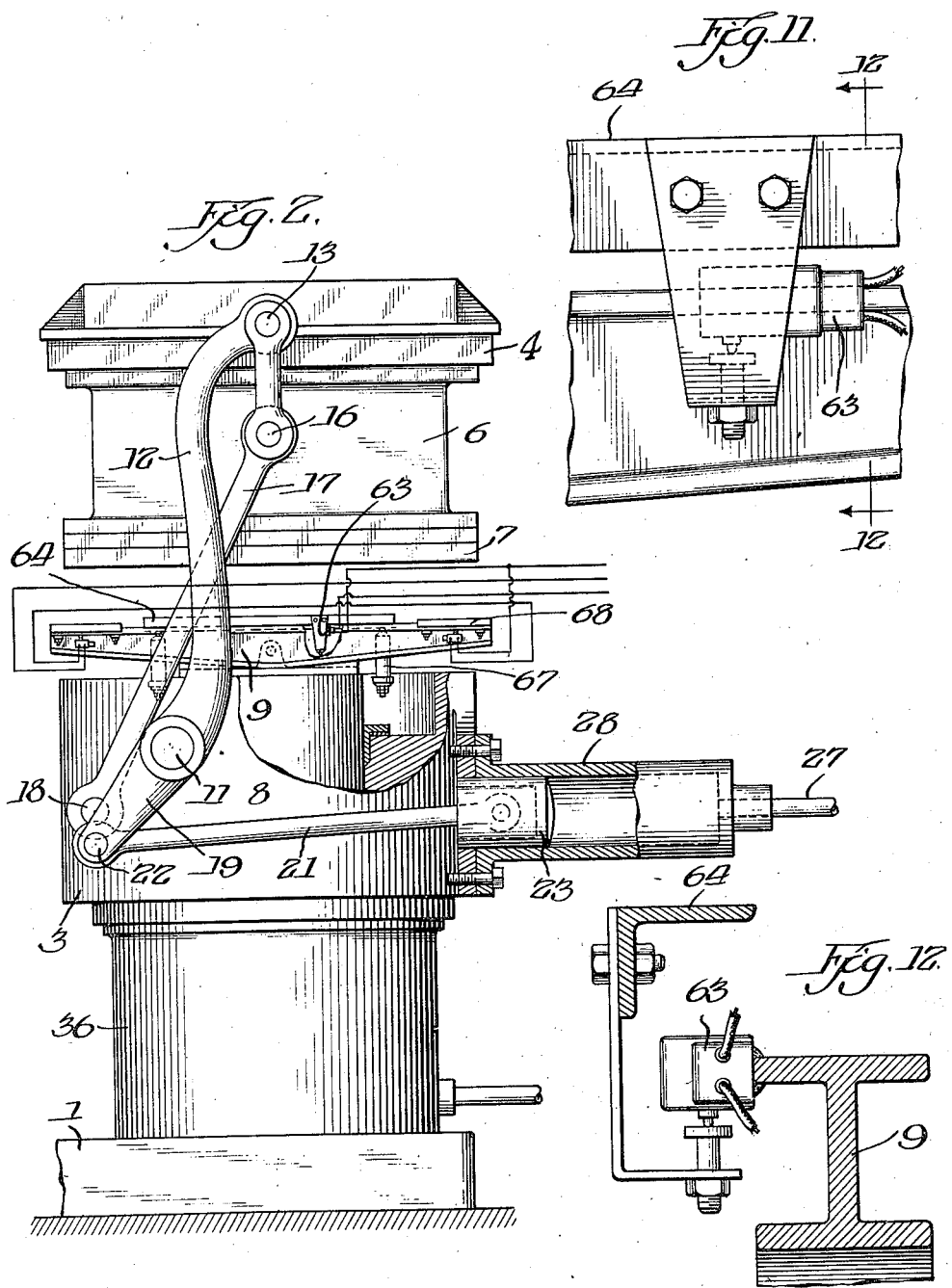
Inventor,
Julius R. Smak Inventor: Julius R. Smak

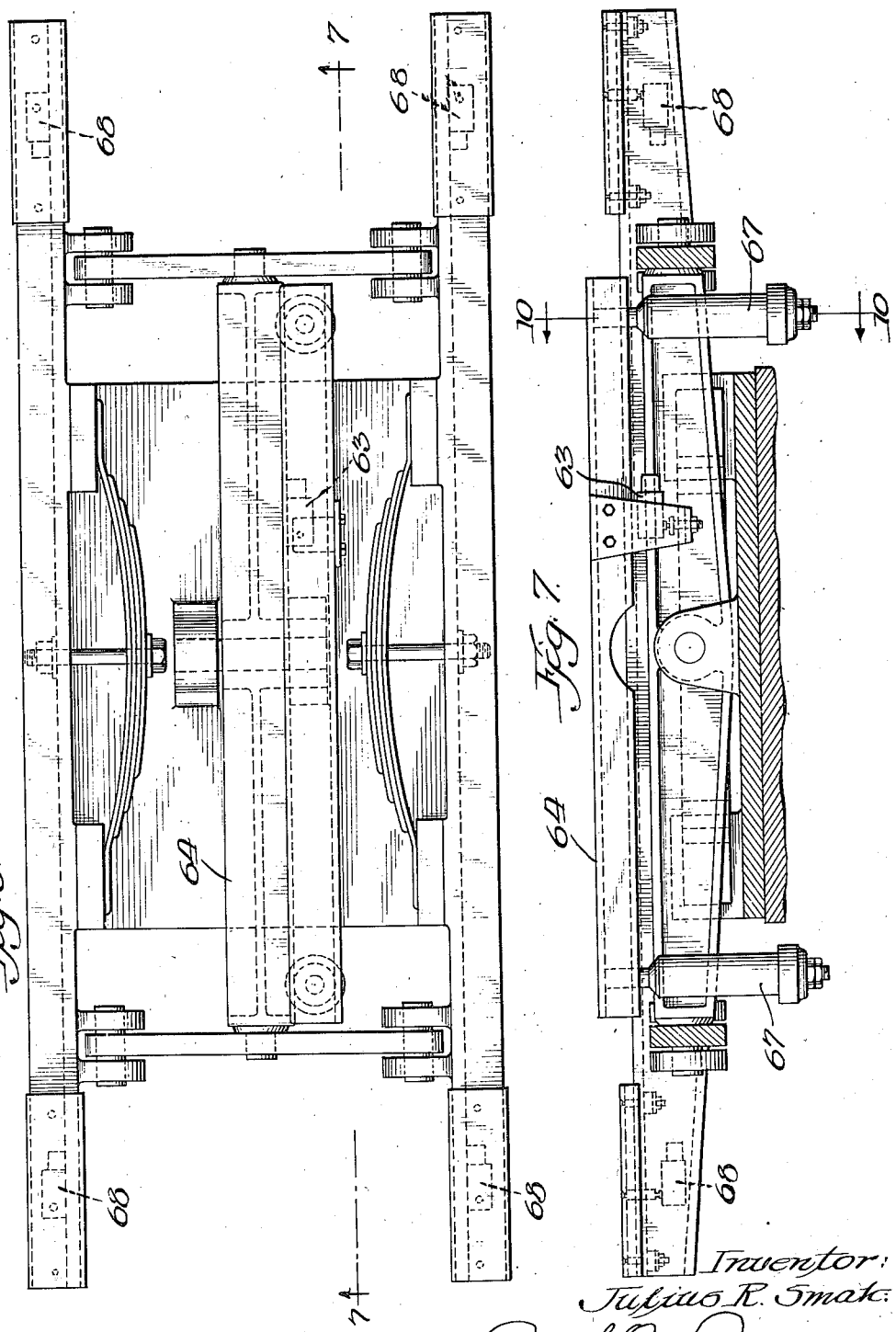

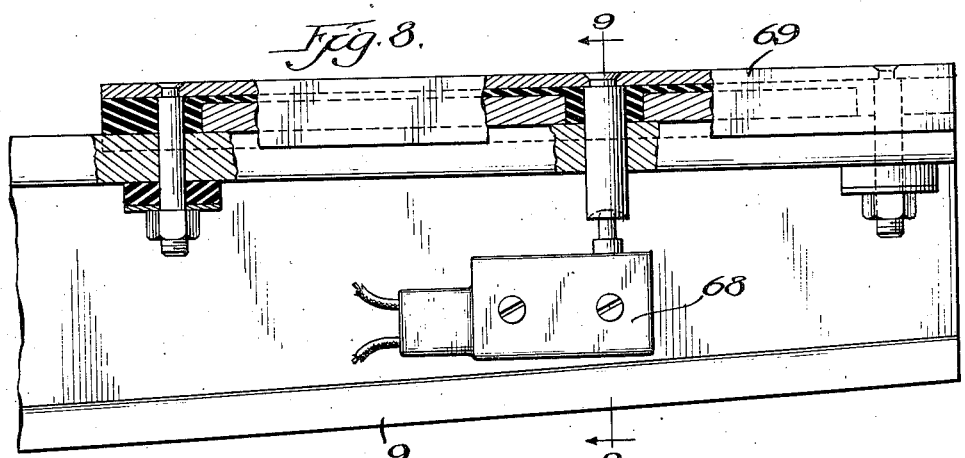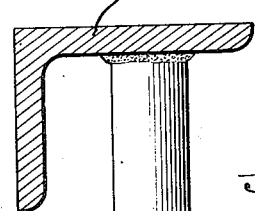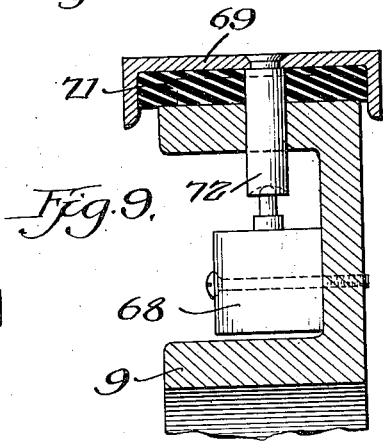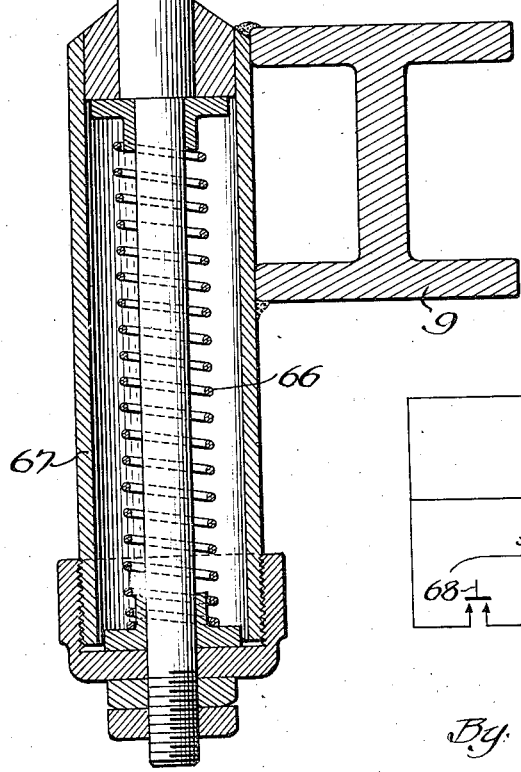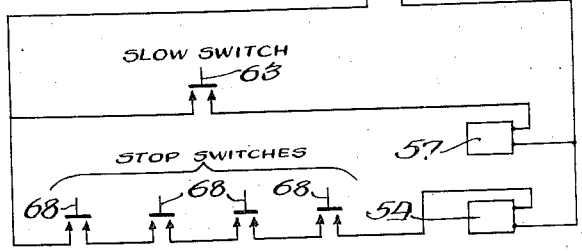

Jan. 5, 1943.   J. R. SMAK   2,307,426
AUTOMATIC SLOW-UP AND STOP MECHANISM
Filed Sept. 12, 1941   8 Sheets-Sheet 7

Inventor:
Julius R. Smak
By: Joseph O. Lange
Atty.

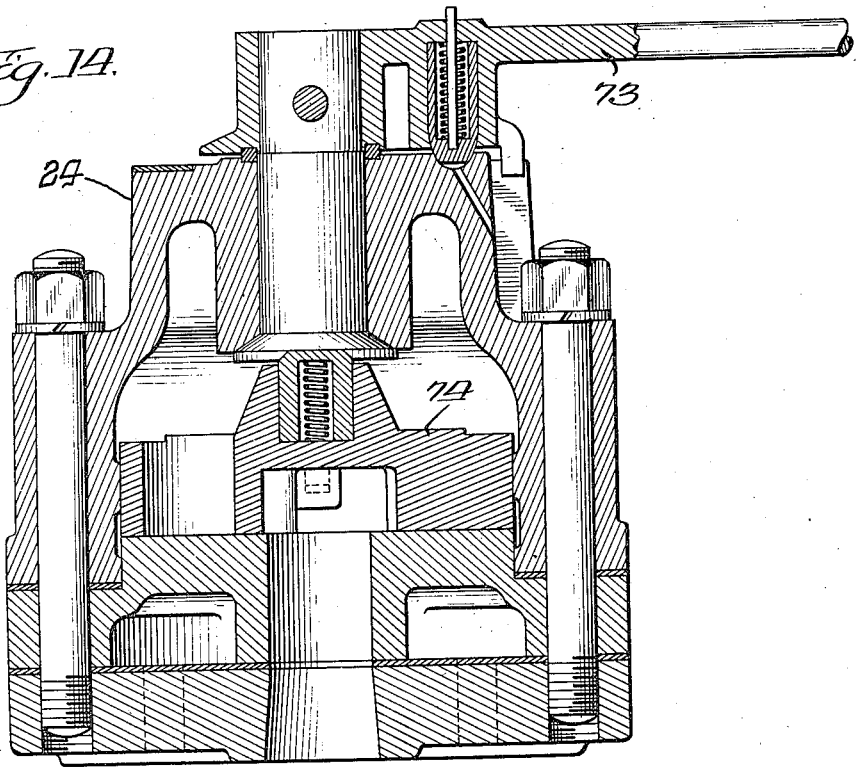
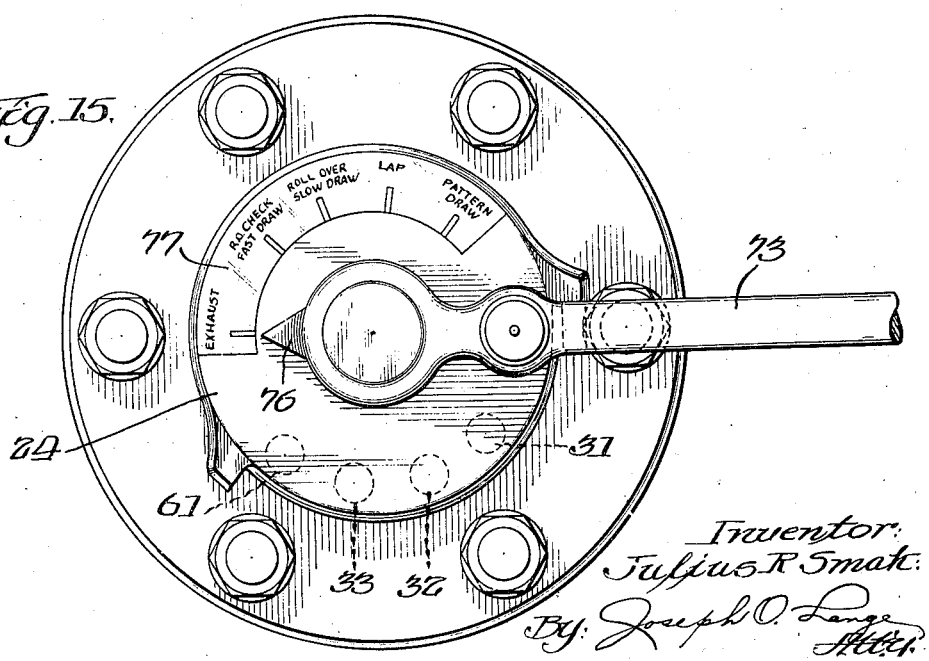

Patented Jan. 5, 1943

2,307,426

UNITED STATES PATENT OFFICE 2,307,426

AUTOMATIC SLOW-UP AND STOP MECHANISM

Julius R. Smak, Bridgeport, Conn., assignor to Crane Co., Chicago, Ill., a corporation of Illinois Application September 12, 1941, Serial No. 410,566

9 Claims. (Cl. 22—47)

This invention relates to a novel and improved automatic slow-up and stop mechanism specially suitable for hydraulically operated pattern draw devices and the like, although it will be apparent that this is only one of numerous adaptations. It has for one of its principal objects the provision of means for reducing the speed of the hydraulically impelled cylinder used in connection therewith to such a degree that the latter can be controlled and stopped within minute limits of movement.

An important object of this device is to provide a means of halting the stroke of a plunger or piston progressing through a cylinder under fluid pressure by means of a slow-up and stop valve which is automatically set in operation by use of electrical switches associated with the plunger or piston.

Another important object is to provide a molding machine pattern draw mechanism and the like employing a speed check means for the draw frame and capable of effecting the immediate stopping of the draw frame when it is in full contact with the flask to be drawn from the pattern, thereby eliminating the usual shock or jolting of the pattern or the mold.

A still further important object is to insure stopping of the draw frame in its upward travel within fractional portions of an inch effective only after all points of the draw frame have come into contact with the flask.

Other and further important objects will be apparent from the disclosures in the accompanying drawings and the following specification.

The invention in a preferred form is shown in the drawings, in which

The combination of Fig. 1 and Fig. 1A constitutes the assembly of the molding machine turnover and draw mechanism incorporating my invention.

Fig. 2 is a fragmentary view of the device shown in Fig. 1, with the draw mechanism advanced to an intermediate position.

Fig. 5 is a wiring diagram of the manner in which the electrical operation of the device is effected.

Fig. 6 is a top plan view of the draw frame of this invention.

Fig. 7 is a sectional view of the draw frame taken on the line 7—7 of Fig. 6.

Fig. 8 is an enlarged fragmentary view of a corner portion of the draw frame.

Fig. 9 is a sectional view of the stop switch taken on the line 9—9 of Fig. 8.

Fig. 10 is a sectional view of the spring cylinder housing taken on the line 10—10 of Fig. 7.

Fig. 11 is an enlarged fragmentary view of the slow-up switch portion of the draw frame.

Fig. 12 is a sectional view taken on the line 12—12 of Fig. 11.

Fig. 14 is a vertical sectional assembly view of the manually operated control valve.

Fig. 15 is a top plan view of the control valve referred to in Fig. 14.

Figure 3:
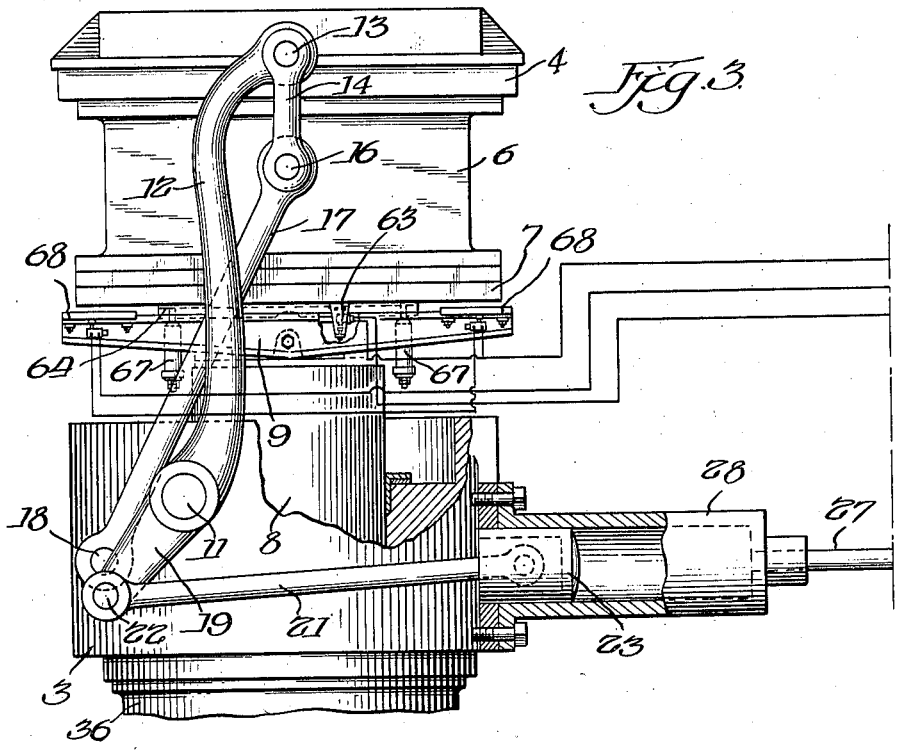
Fig. 3 is a fragmentary view similar to Fig. 2 showing one step in the pattern drawing operation.

Referring now to the drawings and specifically to Fig. 1, the reference numeral 1 indicates generally a base or foundation upon which is mounted a conventional molding machine having the fixed pedestals designated 2 and 3. Superposing the pedestal 2 is the pattern plate 4 upon which is mounted the flask 6 and its bottom board 7. The pedestal 3, as indicated, contains the draw cylinder of the molding machine having the draw piston 8 upon which is mounted the draw frame 9. Pivotally attached to the pedestal 3, as indicated at 11, is the suitably curved arm 12 having its other end fixedly pivoted at 13 onto the pattern plate 4. A short arm 14 extends between the pivot point 13 and another pivot point 16 shown directly above the point 13 on the flask 6. Another arm 17 extends between the point 16 and another pivot point 18 on the pedestal 3 which is closely adjacent the point 11. The arm 12 has a rearward extension 19 on the opposite side of the pivot point 11 and which is operated or moved by the connecting rod 21 being pivotably attached thereto at 22. This connecting rod 21 is reciprocably movable by means of the piston 23 in which it is pivotally mounted, as indicated at 20. The piston in turn is actuated by the operation of a conventional multi-port control valve 24, the internal construction of which is shown in greater detail in Fig. 14. As will be apparent, the valve 24 serves as the controlling means in supplying air pressure to the rollover oil tank 26 (Fig. 1A) which allows for the oil therein under pressure to flow through the pipeline 27 to the cylinder 28 (Fig. 1) in which the piston 23 is mounted. The forward movement of the piston 23 drives the pivotally mounted connecting rod 21 forward and thereby lifts the arm 12 about its point of pivotal attachment 11 by the arcuate movement of the rearward extension 19. As better shown in Fig. 2 in which the piston 23 is shown at its innermost position of travel, at this stage the arm 12 has lifted the flask 6 and its associated parts to a location directly above the pattern draw frame 9. During its upward travel in an arcuate path the arm 17 functions as a trunnion to cause the flask 6 to be inverted as shown in Fig. 2 whereupon the bottom board 7, shown at the top in Fig. 1, is now positioned at the bottom.

Thus far the description given has been largely concerned with that structure of a conventional molding machine equipped with the turnover mechanism as described. From the lowered position in which it is shown in Fig. 1, the draw frame 9 is moved upwardly under the influence of the draw piston 8, the latter member receiving its actuating force from pressure of oil or any other suitable fluid received from the pattern draw oil tank 29. The actual control of the oil from the tank 29 is effected by the valve 24 previously referred to, which by means of its multiplicity of ports controlled by a single closure member, permits of such flow control being conveniently obtained. In actual operation, the control valve 24 is arranged to allow air or other fluid pressure from any suitable source of supply 31 to be directed to the rollover oil tank 26 through the pipe 32 at which time the molding machine is then moved from what is commonly termed a jarring position to a rolled over position, as shown in Fig. 2. After the operation just described, the control valve 24 is then closed so as to effect stoppage of flow of air through the pipe 32. By suitable rotation of the slide valve closure, and by virtue of the several ports as more clearly shown in Fig. 15, the air pressure is now directed to the pattern draw tank 29 (Fig. 1A) through the pipe 33. The air behind the oil forces the latter fluid through the pipe 34 to the draw cylinder 36 resulting in the rapid upward movement of the draw piston 8. The draw frame 9 under the influence of the same effort likewise moves upwardly at full speed. At this stage heretofore, however, the draw frame would stop abruptly and with a jar against the bottom plate 7 of the flask 6 frequently resulting in a distorted pattern or corebox and damage to the mold itself. It is therefore a primary object of my invention to provide means for overcoming this objectionable condition and more specifically to control to a fine degree the speed at which the draw frame travels upwardly so as finally to check the upward movement of the draw frame when it is in alignment and contact with the molding flask.

For the above purpose, a combined slow-draw and slow-up valve 37 is positioned, as shown in Fig. 1A, in the pipeline 34 thus directly controlling the movement of the draw frame 9 by either stopping, retarding, or else permitting full flow of fluid from the pattern draw tank 29 to the draw cylinder 36. As better shown in the detailed view of Fig. 13, the valve 37 is provided with an inlet 38 directly connected to the pattern draw reservoir tank 29 with the outlet 39 feeding to the draw cylinder 36. The valve is preferably provided with a pair of superposed pistons 41 and 42. Actuation of the lower piston 41 in a downward direction forces the valve disc 43 upon its seat 44. The piston 41 is rigidly coupled with the disc 43 by means of the bolt 40. The upper piston 42 operates concurrently with the piston 41 and thereby acts likewise to move the valve disc 43 downwardly. Normally the valve disc 43 is maintained away from the seat 44 by the coil spring 46.

Figure 13:
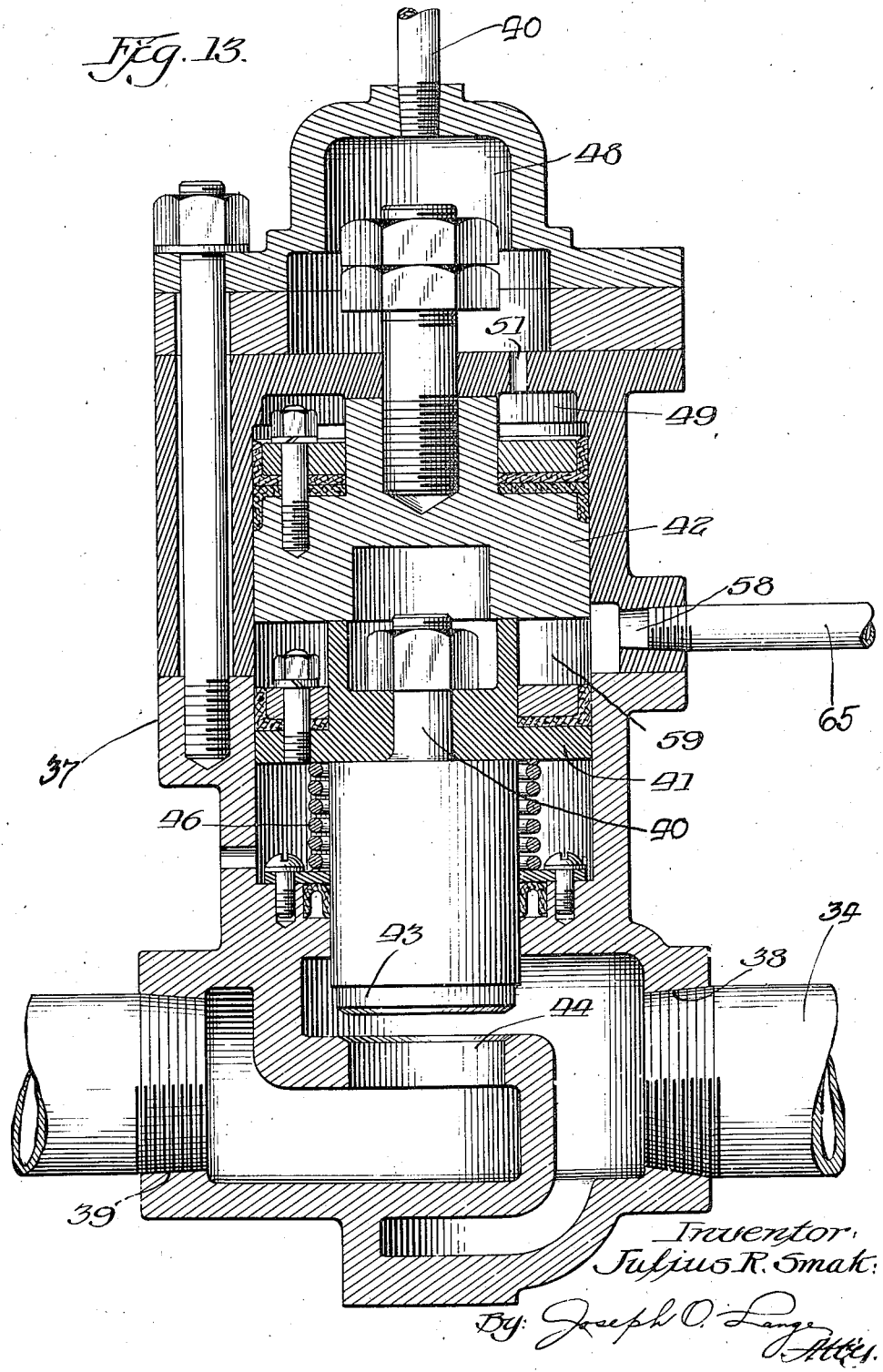
Fig. 13 is a vertical sectional view of the conventional slow-up and slow-draw valve selected for use in conjunction with my novel arrangement.

Referring again to Fig. 1A piped immediately above the valve 37 just described in detail, is the conventional two-way check valve 47 which, as indicated, is connected directly to the valve 37. From the lower portion of the check valve 47, the pipe 40 communicates with the valve 37, entering therein above the piston 42 into the chamber 48 which is supplemented with a lower oil compartment 49 (Fig. 13). The chamber 48 and the oil compartment 49 are cross-connected with each other through the restricted orifice 51. The functioning of this arrangement is effected by the air passing from the control valve 24 through the pipe 33 to the pattern draw tank 29 being partially diverted therefrom through the pipe 52 through the air strainer 53 to the usual solenoid valve 54. Immediately before the solenoid valve 54 the air passage is bypassed via the T-fitting 45 through the pipe 56 to a second solenoid valve 57 which has its outlet piping 55 passing into one pressure side of the two-way check valve 47. The outlet 65 of the solenoid valve 54 passes into the valve 37 through the inlet 58 into the air chamber 59 immediately above the valve piston 41. The opposite pressure side of the piston actuated two-way check valve 47, connected as at 60, is operated directly from the manual control valve 24 through the pipe 61.

Figure 4:
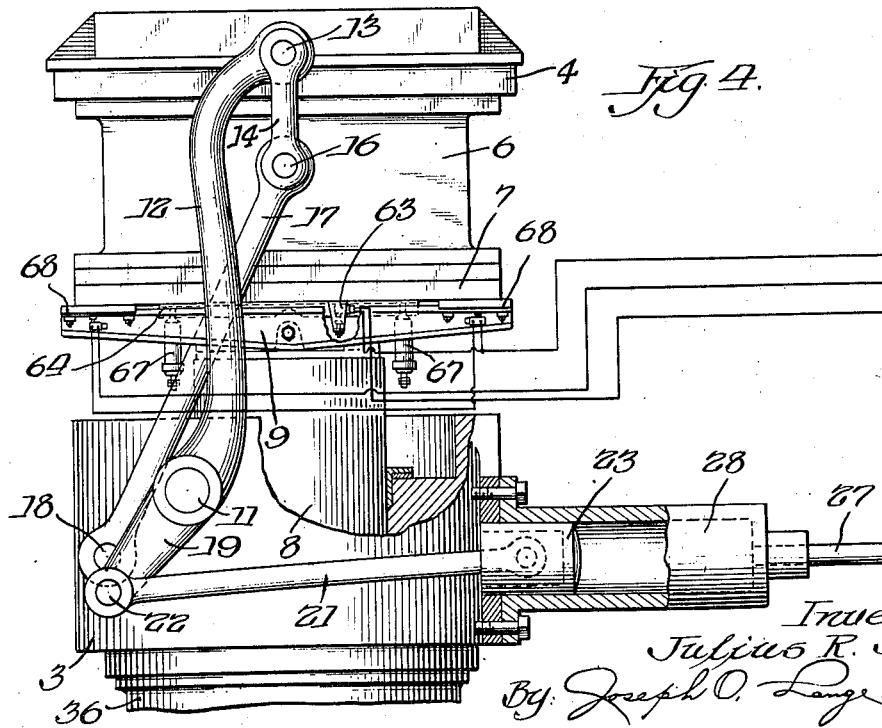
Fig. 4 is a view similar to Fig. 3 illustrating in further detail another step in the pattern drawing operation.

The draw frame 9 is supplied with special electrical switches which operate by contact thereof with the bottom board 7 of the flask 6 on the upward movement of the draw frame. A source of electromotive force 62 supplies the electricity used in the system. The draw frame 9, as best shown in Figs. 6 and 7, is equipped with what may be termed a slow-up switch 63, the latter being actuated by the bar 64 which extends nearly the entire length of the draw frame. In the latter connection, Figs. 11 and 12 show in greater detail the manner in which the slow-up switch 63 is attached to the draw frame 9 and to the actuating bar 64. As previously referred to, under the urge of the piston 8, the draw frame 9 traveling upwards at relatively full speed reaches the position as shown in Fig. 3, at which time the actuating bar 64 contacts the bottom board 7 of the flask 6. The latter contact causes a depression of the bar 64 by suitable compression of the springs 66 located at the ends of the bar 64 in the cylinder housings 67 as best shown in Fig. 10. Depressing the bar 64 closes the switch 63 and thus completes an electrical circuit to operate the solenoid valve 57. Operation of the solenoid valve opens the latter to admit air to be bypassed from the pipeline 52 to communicate with the two-way check valve 47, causing the reciprocably movable piston (not shown) of the two-way check valve to shut off flow from the pipeline 61. As a result of this valve actuation, air now passes through the check valve 47 from the solenoid valve 57 through the pipe 40 into the upper chamber 48 of the valve 37 as shown in Fig. 13. The air pressure is thus forced through the small orifice 51 upon the oil within the compartment 49. It will be apparent that the action of the air on the oil through such a small orifice will cause a retarded action within the chamber 49 similar to that of a dashpot. The oil is forced in relatively small volume upon the pistons 42 and 41 downwardly, compressing the spring 46 and thereby reducing the opening between the disc 43 and the seat 44. The latter action will accordingly restrict the flow of fluid from the inlet 38 to the outlet 39. However, the flow of the air forcing the oil through the opening 51 is so reduced that the seat 43 of the valve 37 actually does not seat. The draw frame proceeds upwardly until the switches 68 positioned at the four corners of the draw frame 9 contact the bottom board of the flask. These switches 68 are preferably wired in series, as best shown in Fig. 5, in line with the solenoid valve 54, and by reason of the aforesaid wiring arrangement, the proper alignment of the draw frame is assured with the bottom board of the flask. Regardless of the order in which the corners of the draw frame 9 contact the bottom board 7, as best shown in Fig. 4, the final stop will occur only after all of the switches 68 have been closed. The latter stop of the draw frame 9 will be instantaneous as air will be allowed to pass through the solenoid valve 54 through the opening 58 in the valve 37 directly to the air chamber 59. Without any interference from oil or the like the piston 41 will be driven downwardly, thus causing the valve to close entirely upon the seating of the main valve disc 43 on the seat 44. It will be apparent that if the stop switches 68 positioned on the corners of the draw frame were wired in parallel, the mere closing of one switch would be capable of exciting the solenoid valve 54 and so permit the valve 37 to close, thus stopping the draw frame with only one corner in actual contact with the bottom board 7. By the provision described, however, each stop switch must be closed before the solenoid valve 54 is excited and therefore the device has a self-aligning draw frame which insures perfect alignment of machine with work and an instantaneous stop when the last contact is made. Obviously the stop switches 68 are not limited to corner locations but can be placed in any position on the draw frame and can be of any number desired, depending upon the number of gaging or contact points deemed to be necessary for the particular application in which it is used. This automatic control prevents over travel of the draw frame as well as any strains or stresses on associated parts which formely accompanied prior hydraulically operated draw frames.

In actual practice, the slow-up switch 63 has its contacting bar 64 preferably about one inch above the contact points of the stop switches 68. Therefore, after the slow-up switch completes the circuit including the actuation of the solenoid valve 57 and partial closing of the valve 37, the draw frame 9 still travels the inch provided before the draw frame 9 and the series of stop switches 68 are in complete contact with the bottom board 7 of the flask 6. For the reasons previously referred to, the travel of this remaining inch is at a reduced rate of speed inasmuch as the fluid from the reservoir tank 29 is restricted in its passage to the draw cylinder 36. Hence, this reduced rate of speed provides for stopping the draw frame within relatively close limits after the stop switches 68 have completed the circuit with the solenoid valve 54 to thereby shut off the slow-draw and slow-up valve 37. Actual experience has demonstrated that the machine of this invention is capable of stopping its upward movement within .003 of an inch. The cessation of travel within such finely controlled distance positively eliminates any damage from jarring or sharp impact of the draw frame against the bottom board 7 in withdrawing the flask 6 from the pattern 4.

As best shown in Figs. 8 and 9, the stop switches 68 are preferably provided with contact bars 69 mounted on the rubber pads 71, the latter being compressed upon contact of the bars 69 with the bottom board 7 and so force the plunger 72 which is integrally attached to the bars 69 downwardly to close the electrical switches 68 and hence complete the circuit with the solenoid valve 54. It will be readily seen that these switches and contacts therefor can be made in numerous ways but for the purpose of illustration, it is sufficient that I have shown only a single preferred form of switch.

Figs. 14 and 15 show in greater detail the manual control valve 24 referred to in this specification. This control valve 24 is provided with an operating handle or lever 73 which is used to actuate the rotary valve 74 manually to selectively permit passage of air from the source of supply 31 to either one or more of the several outlets, as best shown in Fig. 1A. Fig. 15 shows a preferred arrangement in which the handle 73 is provided with a pointer 76 coacting with a dial 77 having inscribed thereon the several operations of the rollover and pattern draw mechanism for the entire machine, and in the latter respect, the dial 77 is self-explanatory.

In summation, it has been demonstrated that the novel pattern draw mechanism of my invention will result in the saving of many molds that heretofore were damaged by the contact of the draw frame, traveling at full speed, with the bottom board of the flask. It will of course be apparent that the two-step control of this device which incorporates a valve operated by two solenoid valves, one of which will act to slowly close the valve and the other of which will immediately close the valve, can undoubtedly be used to advantage on any hydraulically operated presses wherein it is desired to control the travel of such press within minute limits.

Thus I am aware that many changes may be made and numerous details of construction varied throughout a wide range, and I therefore do not propose limiting the patent granted hereon, otherwise than as necessitated by the prior art.

I claim:

1. In a pattern draw mechanism comprising, in combination, a draw cylinder, a draw piston therefor reciprocably movable and connected to a supply of fluid under pressure, a valve between the fluid supply and the draw cylinder, a draw frame mounted on the draw piston, means for retarding the travel of the piston and the draw frame when in operation, independent means for stopping the movement of the draw piston and draw frame, the said retarding means coacting with the said valve to reduce the valve opening and the said independent means coacting with the said valve to close the latter member.

2. In a pattern draw mechanism of the character described comprising, in combination, a draw cylinder, a draw piston within the said cylinder, a valve between a supply of fluid under pressure and the said draw cylinder, a draw frame mounted on the said draw piston, means for retarding the travel of the said piston and the said draw frame when in operation, separate means for stopping the movement of the draw piston and the draw frame, the first of said means coacting with the said valve to reduce the valve opening and the second of said means coacting with the said valve to close the said valve, the said first means including an electrical contact switch, a solenoid valve in the circuit with the said contact switch whereby upon closing of the said contact switch the said solenoid valve is opened permitting passage of air under pressure to the said valve.

3. In a pattern draw mechanism, the combination of a draw cylinder, a draw piston reciprocably movable within the said draw cylinder, a valve between a fluid supply and the said draw cylinder, a draw frame mounted upon the said draw piston, electrical switch means coacting with the said valve to reduce the valve opening for retarding the travel of the said piston and the said draw frame when in operation, independent means coacting with the valve to close the latter member for stopping the movement of the draw piston and draw frame, a solenoid valve in the circuit with the said switch means whereby upon closing of the said switch means the said solenoid valve is opened permitting passage of air under pressure to the said valve, the said valve having an oil compartment requiring fluid under pressure to act thereon thereby diminishing the force of said pressure whereupon a slow closing action of the said valve results to bring the pattern draw mechanism to a retarded stop.

4. The combination of a pattern draw mechanism, a draw cylinder, a draw piston reciprocably movable through the said draw cylinder in communication with a supply of fluid under pressure for movement of the said draw piston, a valve for control of the fluid supply, a draw frame mounted on the said draw piston, a plurality of electrical switch and solenoid actuated valve means coacting with the said valve to reduce the valve opening to retard the travel of the said piston and draw frame, a separate solenoid valve in the circuit with said electrical switch means whereby when contact with all of said electrical switches is made the said solenoid valve will open permitting fluid under pressure to close the said valve.

5. In a pattern draw mechanism, the combination of a draw cylinder, a draw piston arranged for reciprocable movement through the said draw cylinder, a valve positioned between a source of fluid supply and the said draw cylinder, a draw frame movable with the said draw piston, means for slowing the travel of the said piston and the said draw frame when in operation, independent means for stopping the movement of the said draw piston and draw frame, the first of said means coacting with the said valve to reduce the valve opening and the second of said means coacting with the said valve to close the valve, said first means including an electrical contact switch, a solenoid valve in the circuit with the said contact switch whereby upon closing of the said contact switch the said solenoid valve is opened permitting passage of air under pressure to the said valve, a plurality of contact switches mounted on the draw frame and wired in series, a solenoid valve in the circuit with these other contact switches whereby when contact of all these switches is made the said solenoid valve will open permitting air under pressure to close the said valve, a multi-port valve for selectively directing the air under pressure to effect the desired operations of the pattern draw mechanism.

6. In a pattern draw mechanism, the combination of a draw cylinder, a draw piston reciprocably movable through the draw cylinder, a multi-ported valve between a source of fluid supply and the said draw cylinder, a two-way check valve, a draw frame on the said draw piston, means for retarding the travel of the said piston and draw frame when in operation, means for stopping the movement of the said draw piston and draw frame, the first of the said means coacting with the said valve to reduce the valve opening and the second of said means coacting with the said valve to entirely close the valve, said first means including electrical contact switch means, a solenoid valve in the circuit with the said contact switch means whereby upon closing of the said latter means the said solenoid valve is opened permitting passage of air under pressure to the said two-way check valve and to the said first-named multi-ported valve, a plurality of contact switch means wired in series and mounted on the said draw frame, a solenoid valve in the circuit with the said contact switch means whereby when contact is made with all of said switch means the said solenoid valve will open permitting air under pressure to immediately close the said valve.

7. In a pattern draw mechanism of the character described, the combination of a draw cylinder, a draw piston reciprocably movable within the said draw cylinder, a valve between a source of fluid supply and the said draw cylinder, a two-way check valve, a draw frame mounted on the said draw piston, means for retarding the travel of the said piston and draw frame when in operation, added means for stopping the movement of the said draw piston and draw frame, the first of said means coacting with the said valve to reduce the valve opening, the second of said means coacting with the said valve to entirely close the latter member, said first means including an electrical contact switch, a solenoid valve in the circuit with the said contact switch whereby upon closing of the said contact switch the said solenoid valve is opened permitting passage of air under pressure to the said two-way check valve and to the said first-named valve, a plurality of contact switches wired in series and mounted on the said draw frame, a solenoid valve in the circuit with the said contact switches whereby when contact with all these switches is completed the said solenoid valve will open permitting air under pressure to close the said first-named valve, and valve means for selectively reversing the operation of the said two-way check valve.

8. In a pattern draw mechanism comprising a draw cylinder, a draw piston therefor, a draw frame mounted on the said draw piston, means for reciprocably moving said piston, further means for retarding the travel of the piston during its movement, and independent means for stopping the movement of the draw piston and draw frame.

9. In a pattern draw mechanism comprising a draw cylinder, a draw piston therefor, a draw frame mounted on the said draw piston, a supply of fluid under pressure, automatic means for controlling admission of fluid under pressure to the said draw cylinder, additional means for actuating the said automatic means, whereby admission of fluid is initially restricted and subsequently stopped entirely.

JULIUS R. SMAK.